(12) United States Patent
Harrison et al.

(10) Patent No.: US 6,838,616 B2
(45) Date of Patent: Jan. 4, 2005

(54) SECURE ENCLOSURE FOR ACCESS TO CABLED SYSTEMS

(75) Inventors: Michael B. Harrison, Vista, CA (US); Thomas E. Mitchell, Oceanside, CA (US)

(73) Assignee: Secure Systems Licensing LLC, Carlsbad, CA (US)

( * ) Notice: Subject to any disclaimer, the term of this patent is extended or adjusted under 35 U.S.C. 154(b) by 0 days.

(21) Appl. No.: 10/112,353

(22) Filed: Mar. 28, 2002

(65) Prior Publication Data

US 2002/0195261 A1 Dec. 26, 2002

(Under 37 CFR 1.47)

Related U.S. Application Data

(60) Provisional application No. 60/281,240, filed on Apr. 3, 2001.

(51) Int. Cl.[7] ................................................. H02G 3/08
(52) U.S. Cl. .................... 174/50; 174/64; 220/4.02; 248/906
(58) Field of Search ........................... 174/50, 48, 64, 174/63, 58; 220/3.2, 3.8, 4.02; 248/906; 459/535

(56) References Cited

U.S. PATENT DOCUMENTS

| | | | | |
|---|---|---|---|---|
| 3,955,701 A | * | 5/1976 | Fisch | 220/3.7 |
| 5,568,362 A | * | 10/1996 | Hansson | 361/736 |
| 5,773,757 A | * | 6/1998 | Kenney et al. | 174/53 |
| 5,800,028 A | * | 9/1998 | Smith et al. | 312/223.1 |
| 5,837,933 A | * | 11/1998 | Fligelman | 174/50 |
| 6,147,304 A | * | 11/2000 | Doherty | 174/48 |
| 6,274,811 B2 | * | 8/2001 | Blalock | 174/58 |
| 6,483,032 B2 | * | 11/2002 | Adams | 174/66 |

* cited by examiner

Primary Examiner—Dhiru R. Patel
(74) Attorney, Agent, or Firm—Gordon & Rees LLP

(57) ABSTRACT

An enclosure is disclosed which is highly secure, permits access to a cabled network system only by one user at a time, permits visual and unequivocal observation of the security status of the enclosure, and prevents access to the interior thereof only by authorized persons. The enclosure has back, front and side walls and an interior, with all connections being internal. Limited interior access is provided only through a door and a service opening. Within the enclosure is a system connection device to the system, which is configured for access thereto by only a single user at a time. A lock secures door closure. Thus access to the cabled system through the enclosure is available only to one user at a time and must be obtained through the open door, with usage thereby being visually identifiable, and the door prevents unauthorized access.

16 Claims, 4 Drawing Sheets

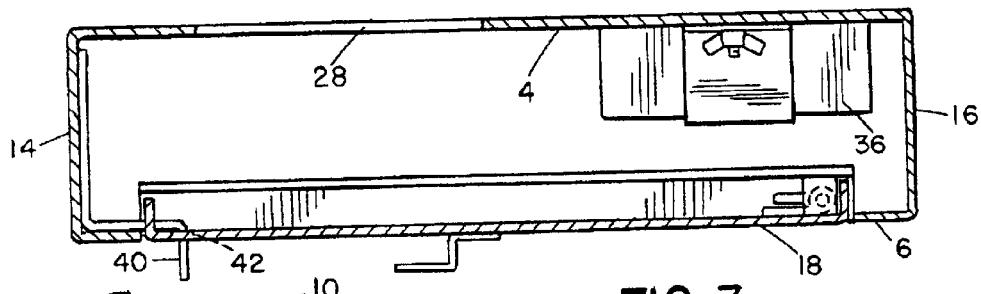
FIG. 3
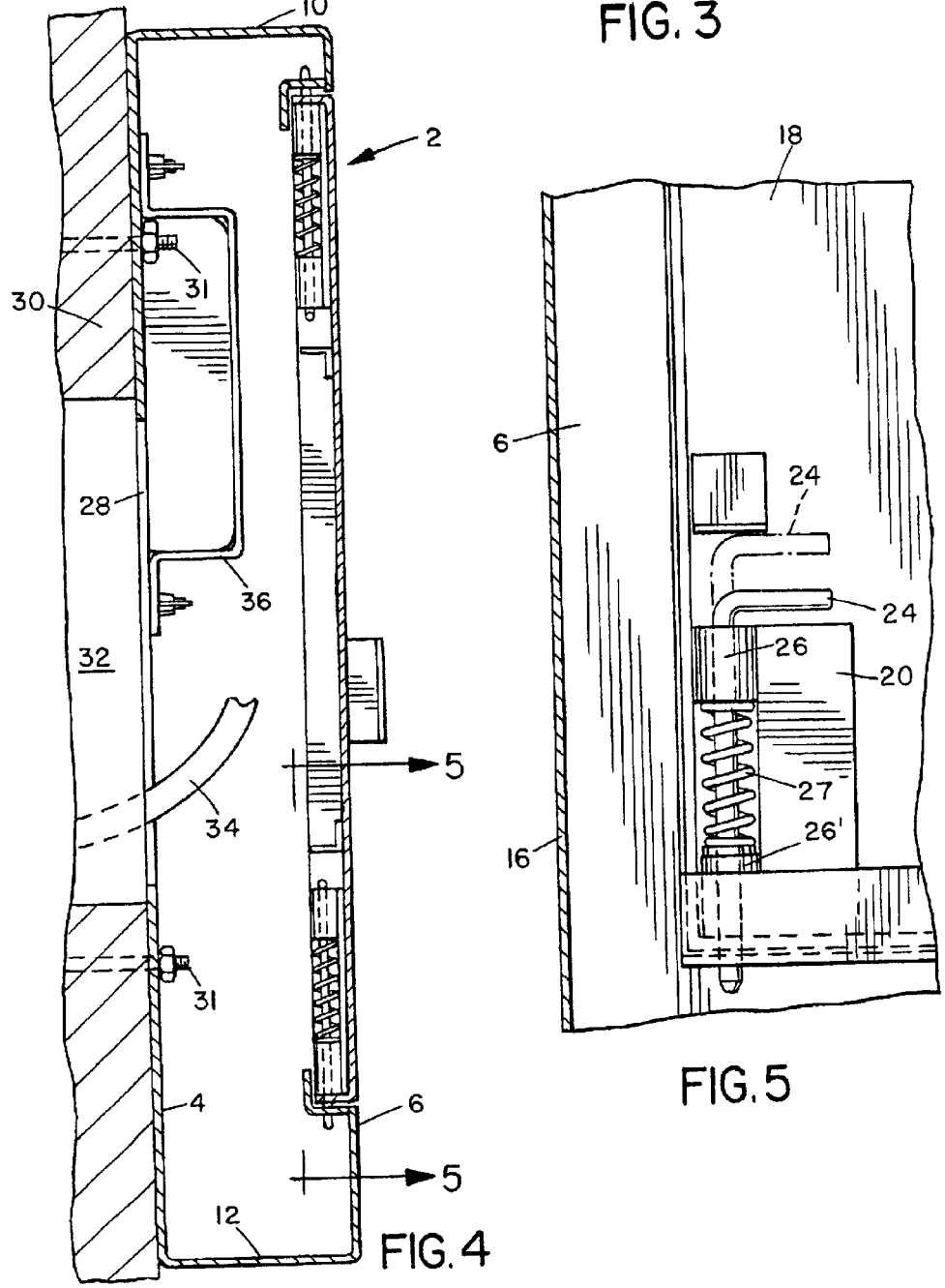
FIG. 4
FIG. 5

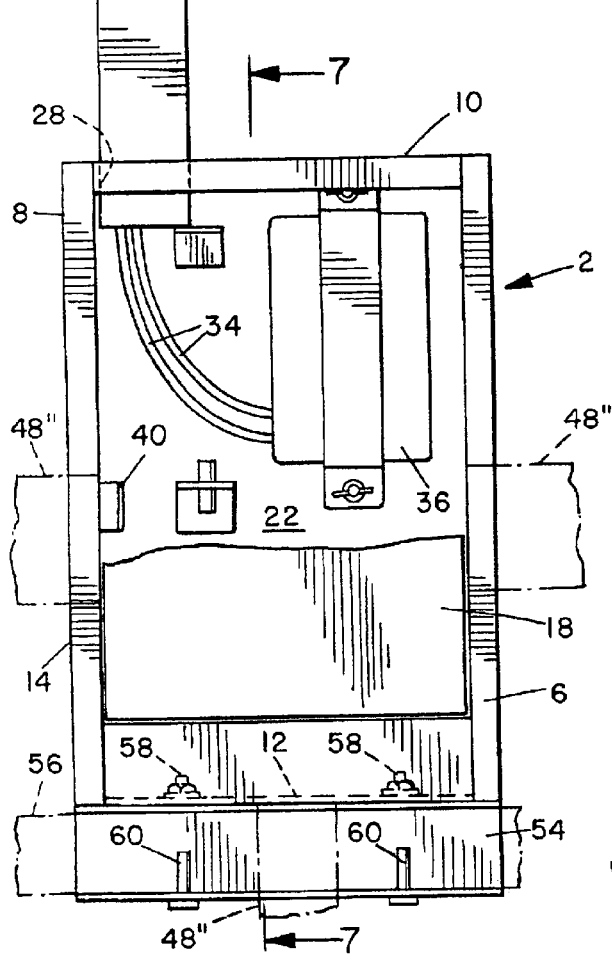
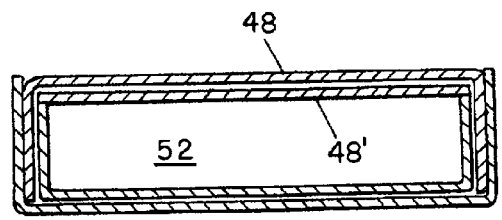
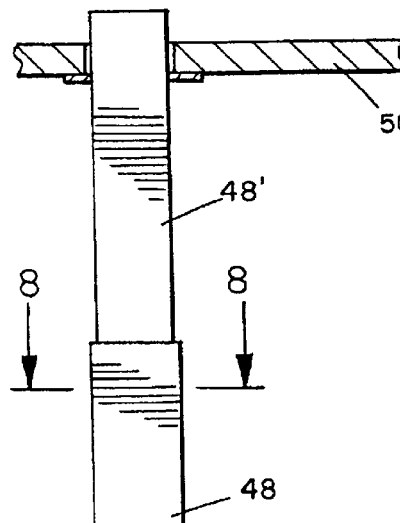
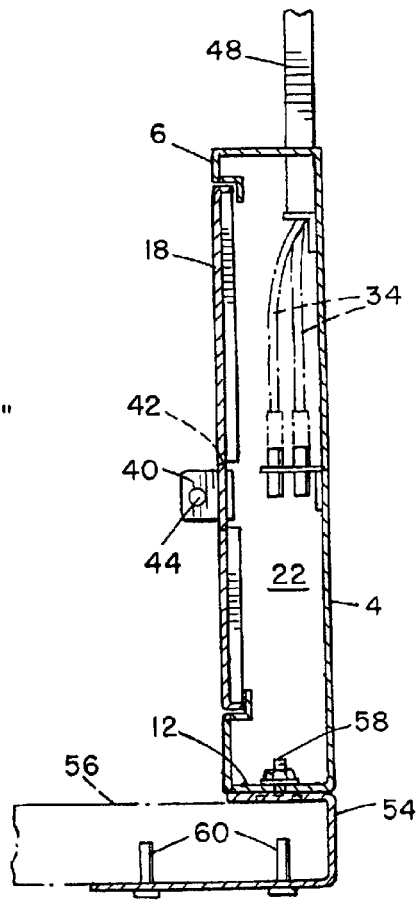

SECURE ENCLOSURE FOR ACCESS TO CABLED SYSTEMS

CROSS-REFERENCE TO RELATED APPLICATION

This application claims priority from U.S. Provisional Patent Application Ser. No. 60/281,240, filed on Apr. 3, 2001.

BACKGROUND OF THE INVENTION

1. Field of the Invention

The invention relates an enclosure for user access to restricted cabled systems, such as cabled communication and computer networks, especially in a manner in which multiple user access at a given time is precluded and security status of the enclosure is visually apparent.

2. Background Information

In many company and government facilities, it is important for the employees to have access to exterior and interior secure computer networks, communication networks and other electronic systems. It is also important, however, for access to such systems out to be controlled and limited as to the identification of the people who are allowed to have such access, to have a means of insuring that the system is kept secure and that it can be determined who is using the system and when the system is accessible.

At such company and government workplace facilities, access to a computer, electronic or communications network system is through computer terminals which are permanently linked to the system, which may be internal or external to the office or location. While such linkages are convenient they are also quite insecure because it is difficult to tell when a computer is on, who is attached to the system at any time, and when the system is inaccessible.

In view of the current need for a high level of security in communication, computer and other electronic systems, businesses and government agencies have been seeking devices which can allow access to such systems but which can provide a great deal of control of security and identification of the system users. In particular the U.S. government agencies have issued a number of guidelines and specifications for secure access enclosures through which users must access the systems. The requirements are such that the secure enclosures must prevent unauthorized access, must limit access only to people who are authorized to access the system through the enclosure and must provide clear indications of when system access has become insecure.

SUMMARY OF THE INVENTION

The invention herein is an enclosure which is highly secure, permits access to a cabled system only by one user at a time, permits visual and unequivocal observation of the security status of the enclosure, and permits access to the interior thereof only by authorized persons. The enclosure is easily fabricated of high strength penetration resistant materials and can be readily opened an accessed by authorized persons, but strongly resists any attempts at access other than through the enclosure door. The enclosure is designed to be self-contained and is the final delivery point for a protected distribution system (PDS) secure network. As such it may be configured as passive only or may have active electronic components. It also is capable of meeting many of the requirements of government security specifications which are currently in effect or proposed.

More specifically, the invention is an enclosure for secure interconnection access to a cabled system by a user thereof, which comprises a housing having a back wall and a front wall connected by a peripheral wall, the walls defining an interior space in the housing, all joints therein being within the interior or on an interior side of the walls; the walls limiting user access to the interior space only through the front wall comprising an openable door, the door being hinged within the enclosure or on the interior side of the walls; a system connection member disposed in the interior and including interconnect means for connection to the system only through a service access opening in the back wall or the peripheral wall, the system connection member being configured for access thereto by only a single user at a time; and locking means for secure closure of the door; whereby access to the cabled system through the enclosure is available only to one user at a time and is visually identifiable and closure of the door securely prevents unauthorized access to the connection means and the system.

By "cabled" is meant any system which is comprised of signal transmission cables and is to be distinguished from "radio" or similar "wireless" transmission systems which do not rely on physical interconnection. However, where an overall system includes both cabled and wireless portions, this invention is applicable to the cabled portions which will be considered to be a "cabled system" for the purposes of this description. Cabled systems include, but are not limited to, systems which use fiber optic cable, co-axial cable and/or copper, aluminum or other conductive metal wire cable.

The enclosure may be mounted at a wide variety of locations within a facility, such as at floor level, at a work station or on a wall, pedestal, riser, or other support. It is not designed to be plenum rated.

BRIEF DESCRIPTION OF THE DRAWINGS

FIG. 3 is an enlarged sectional view taken online 3—3 of FIG. 2;

FIG. 4 is an enlarged sectional view taken on the line 4—4 of FIG. 2;

FIG. 5 is an enlarged sectional view taken on the line 5—5 of FIG. 4;

FIG. 6 is a front view, with portions cut away, showing the enclosure within mounting bracket and a wire enclosing channel;

FIG. 7 is a sectional view taken on line 7—7 of FIG. 6;

FIG. 8 is an enlarged sectional view taken on line 8—8 of FIG. 6;

DETAILED DESCRIPTION AND PREFERRED EMBODIMENTS

Figure 1:
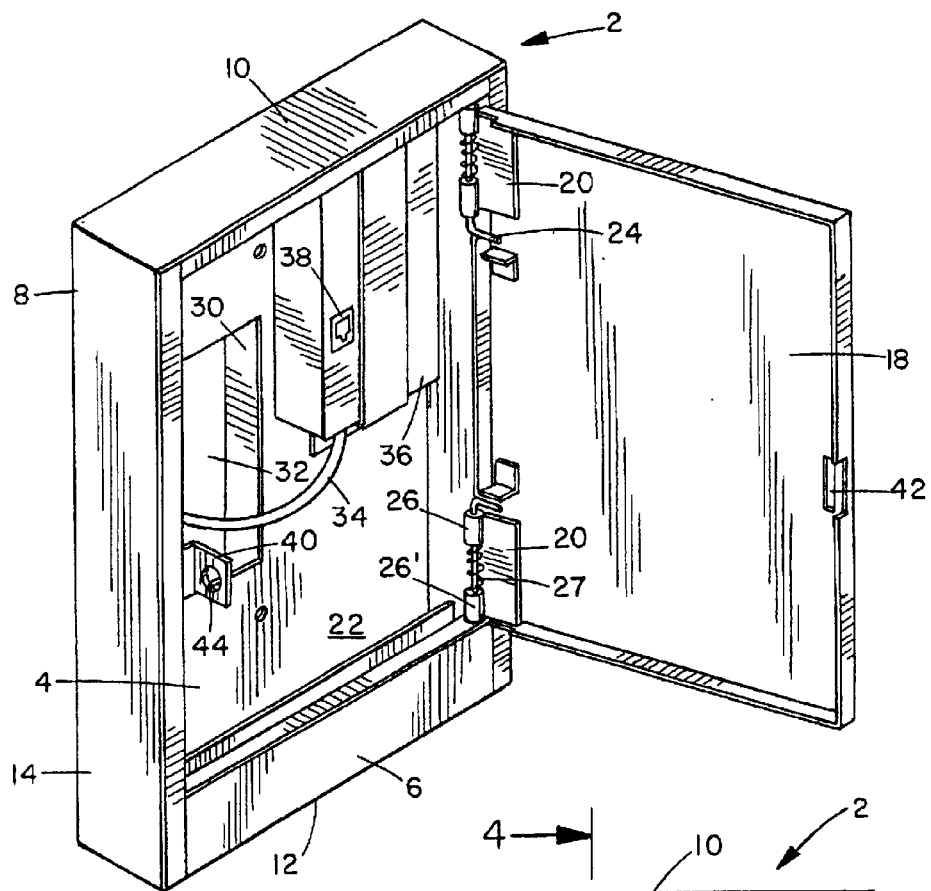
FIG. 1 is a prospective view of the enclosure with the door open.
Figure 2:
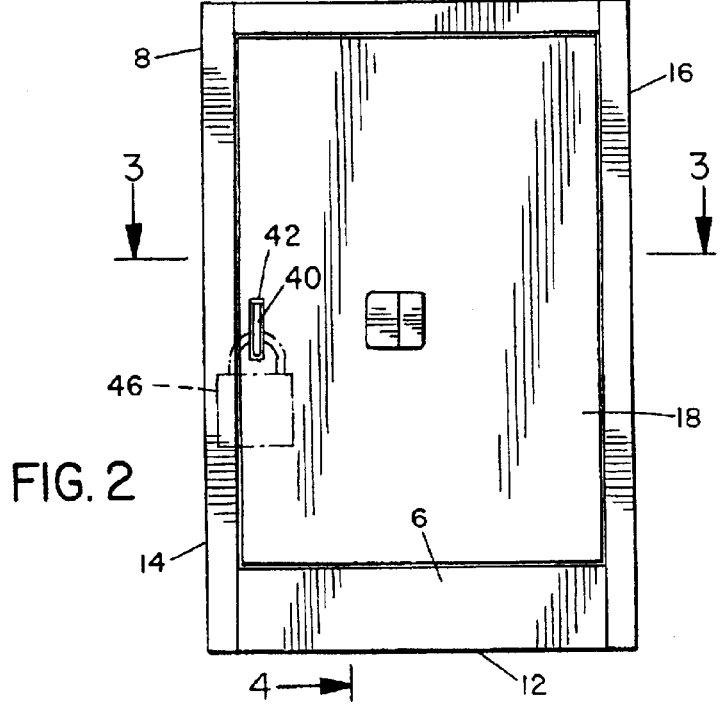
FIG. 2 is a front view of the enclosure.

The invention herein can be best understood by reference to the drawings. The enclosure 2 is a box-like structure having a back wall 4, a front wall 6 and a peripheral wall 8 which is normally configured as four walls representing the top, bottom, and right and left side, as the enclosure would appear in a normal wall or pole mounting. For convenience these sides will be represented respectively by the numerals 10, 12, 14 and 16.

Mounted to the front wall 6 is an openable door 18. Door 18 is mounted on hinges 20, best illustrated in FIG. 5. The working mechanism of each hinge 20 is positioned within the interior of 22 of the enclosure so that no portion of the hinge 20 is accessible from outside the enclosure when the door 18 is closed. This prevents anyone from trying to open the enclosure by removing or tampering with the hinges 20. In many cases, however, it is convenient to have the door removed when access to the interior of the box is desired since the user's access cable for connection with the cabled system within the enclosure could become damaged if the door would inadvertently be closed on the cable. For that reason it is preferred that the hinges 20 be of a structure which allows the door 18 to be easily removed once it has been opened. As illustrated in FIG. 5, each hinge 20 has a hinge pin 24 which can be lifted out of the lower (26') of receivers 26 of the leaves of the hinge 20 (to position 24') so that the two leaves of the hinge can be separated and the door can be removed. Thereafter the door can be easily replaced by realigning the two leaves of the hinge and raising the pin 24 to the 24' position and then letting it reinsert through lower receiver 26'. Spring 27 retains the pin 24 in its seated position when the pin is not being manually lifted for door removal or replacement.

Door 18 is preferably openable and closable only manually, which enhances security and simplifies usage.

Other than through door 18 the only access to the interior 22 is through service access opening 28 which is shown in the embodiment of FIG. 3 as an aperture in the rear wall 4 of the enclosure 2. In this embodiment the enclosure 2 is mounted to a hollow wall 30 by bolts and nuts 31 and the service access opening 28 is aligned with an aperture 32 in the wall 30. Within the wall 30 and accessible through aperture 32 is a portion (not shown) of the cabled communication, computer or other network system to which user access is required. In the Figures only the terminal end of cable 34 projecting through aperture 32 from the cabled system is shown.

Also within the enclosure is connection member 36. The nature of the connection member 36 is not critical in the present invention. The cable 34 which permits access to the network system is connected to the connection member 36. The connection member 36 also contains a user connection element 38 which is represented schematically. The specific connection member 36 and the connection element 38 will be selected depending upon the nature of the system and upon the type of equipment and interface possessed by the user. For instance, if the network system is a computer system, such as a computer network, the connection member 36 and the connection element 38 will be such that a user of a computer interface terminal who accesses the enclosure will be able to connect the appliance cable (not shown) from his or her terminal to the connection element 38 in the connection member 36 and thereby connect through cable 34 with the computer system. Those skilled in the art will be immediately aware of the appropriate type of connection member 36 and connection element 38 for each different system and user device.

The interior 22 of the enclosure and the connection member 36 are normally configured such that only one user can connect to the connection member at a time. (A enclosure and connection member could be configured for use by more than user at a time, but that would compromise security, since if a security breach occurred it would be difficult to determine which user was at fault. Therefore it is preferred that the enclosure be maintained exclusively as a single-user configuration.) Once connected the user will preferably have to provide a password or other identifying indicia which can be recorded by security means (not shown) to provide a usage log for security purposes. The user's terminal or other interface device can also be configured to provide an automatic identification signal, including if desired a time signal) upon connection to connection element 38. Because of the presence of door 18, a user cannot access the interior of the enclosure and the connection member without opening the door. It will therefore be visually evident when the system is being accessed because an observer will be able to see that the door is open. If the user is using the system and is connected to connection member 36 that too will normally be evident visually to an observer, and preferably the user can also be seen and identified. If there is no user with a device connected to the connection member 36 but the door is open, an observer will be able to see immediately that the system is not secure and is open to access. Use of an integrated usage log will permit security personnel to determine who was the last previous user so that steps to avoid future compromise of the system can be taken.

Normally when a user is finished accessing the system, he or she will disconnect their terminal cable from connector 38 and remove the cable through door 18 so that the door can be closed. Mounted on the side of front wall 6 of the enclosure is a locking hasp 40 which, when door 18 is closed, penetrates through aperture 42 and projects outwardly from the front of the door (as best illustrated in FIG. 7). The hasp 40 has a keeper hole 44 through which the shank of a padlock 46 can be passed to permit secure locking of the door 18 to the enclosure. The padlock 46 will normally be a high security, heavy duty padlock with a restricted number of keys or with a high security combination lock mechanism. Alternatively the lock may be a cylinder lock mounted in the door 18, but that is less desirable since cylinder locks are often more easily broken into or picked than are padlocks.

An important feature of the enclosure is that all joints, welds and screw or bolt attachments are within the interior 22 of the enclosure, as best illustrated in FIG. 4. This prevents anyone from gaining access to the interior of the enclosure without opening the door 18.

The embodiment of the enclosure described above is one intended for mounting on a wall or other similar flat surface (usually vertical) where access to the system is intended to be through aligned openings 28 and 32 and cable 34. FIGS. 6–8 and 9–10 illustrate two other important embodiments of the invention. FIGS. 6–8 show an enclosure connected to a wire pole 48 or similar vertical wire riser. In the embodiment shown in FIG. 6 riser 48 extends downwardly to the top 10 of the enclosure from an overhead surface such as a ceiling 50 where a portion of the cabled system exists or from which access to that system can be obtained. Cables 34 projecting from the system are directed through the hollow interior 52 of riser 48 and project into the interior 22 of the enclosure for connection to connection member 36. In this embodiment the service access opening 28 is located in the top side 10 of the peripheral wall 8 and the back wall 4 of the enclosure has no opening therein (other than, if desired, bolt access holes for mounting the enclosure on some sort of mounting board such as 70 in FIG. 10).

In the embodiment shown in FIGS. 6–8 the enclosure 2 is seated on a bracket 54 which in turn is mounted to a horizontal surface 56, such as a desktop. Attachment bolts 58 for bracket 54 are disposed securely within the interior 22 of the enclosure. Mounting bolts 60 for attachment of the bracket 54 to the surface 56 can be exposed to the exterior without breach of security since detachment of the bracket 54 from the desktop or other surface 56 does not compromise the secure interior of the enclosure.

The riser 48 can be formed in telescoping sections as illustrated at 48'. To maintain security the telescoping sections will be overlapped as illustrated in FIGS. 6 and 8. The terminal end 54 of riser 48 will project well into the interior 22 of the enclosure through service access opening 28 in order to insure that unauthorized access to the riser 48 cannot be obtained and that access will be possible only from within the interior of the enclosure.

It will be evident upon examination of FIG. 6 that the enclosure can be mounted such that riser 48 approaches the enclosure 2 not only from above as shown in FIG. 6 but also from below through bottom 12 or laterally through either side 14 or 16 as shown at 48". In any of these other cases the service access opening 28 will be placed in the appropriate side and the other three sides will be without any openings therein. In the configuration where the access of the riser is from the below through the bottom 12, the bracket 54 and horizontal surface 56 will either not be present or will be configured to permit access of the riser to and through the service access opening 28 in bottom 12.

Figure 9:
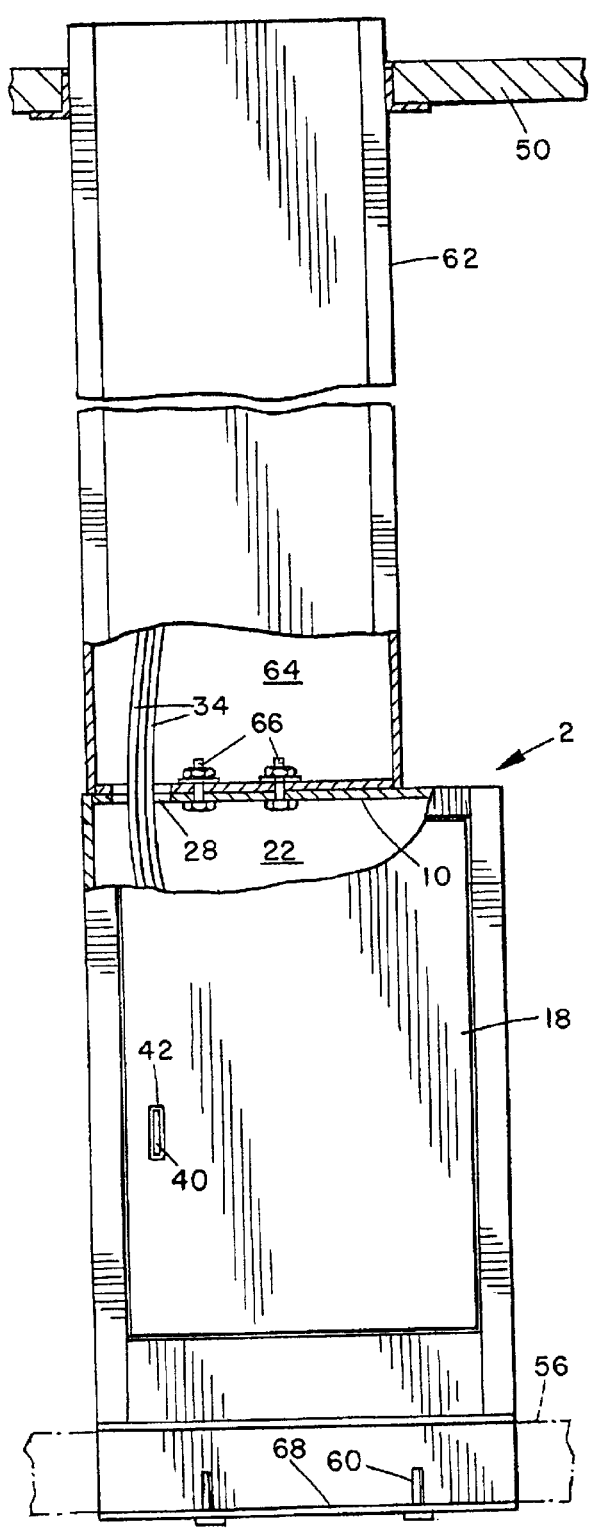
FIG. 9 is a front view, with portions cut away, showing of the enclosure within alternative wire enclosure.
Figure 10:
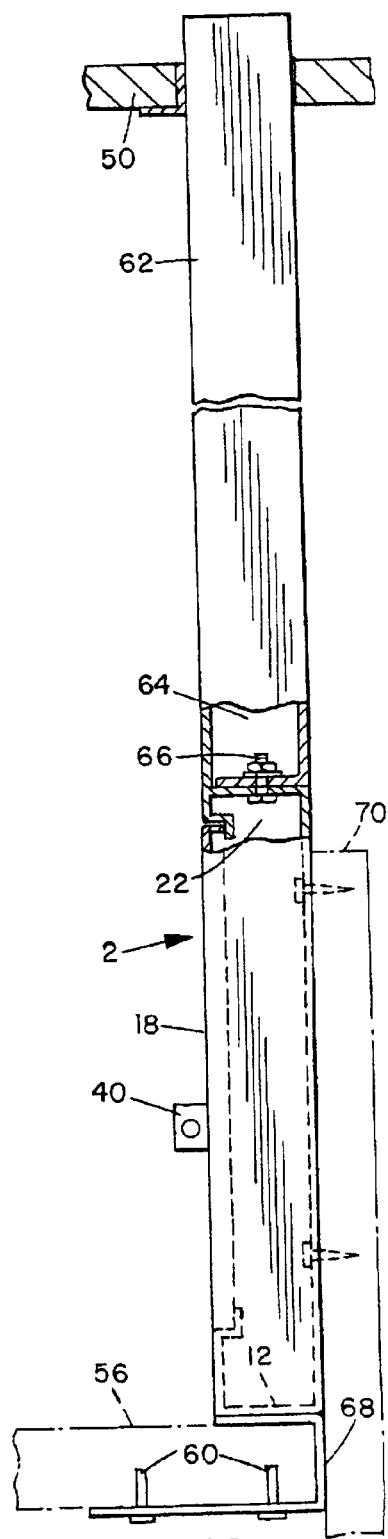
FIG. 10 is a side view of the configuration of FIG. 9, showing the attachment to supporting structure.

The configuration shown in FIGS. 9 and 10 is similar to that shown in FIGS. 6–8, except that the riser 48 is replaced by a cable management conduit 62 which has an interior 64 sufficiently large to accommodate not only cables 34 but also switching or interconnection equipment (not shown) such as patch panels, media converters or other types of electronic equipment. The particular identity of such equipment is not critical to the present invention and will be chosen by those skilled in the art to be appropriate to whatever type of interconnection is being used in connection with the enclosure of this invention. The connection of enclosure 22 to cable management conduit 62 will be through bolts 66. It will be observed that bolts 66 penetrate into both the interior 64 of conduit 62 and the interior 22 of enclosure 2. This does not compromise the security of the enclosure 2, since the interior 64 of the conduit 62 is also similarly secure. It will also be apparent that conduit 62 can approach the enclosure from the sides or bottom, with appropriate relocation of the service access opening 28. As with the embodiment of FIGS. 6–8, this embodiment can also be mounted to or resting on a horizontal surface as illustrated in FIG. 10, preferably using a bracket as 54 or, in the embodiment shown in FIG. 10, having an L-shaped projection 68 adhered to or integral with and extending from bottom 12 of the enclosure. The enclosure may also be attached to mounting board 70 if desired.

The enclosure 2 will be constructed of a high-strength metal or metal alloy or a ceramic or polymeric material which strongly resists penetration and is not readily degraded by the elements if placed in an exposed environment. Numerous acceptable materials are known, including but not limited to high-grade steels. The particular material chosen will often be determined by applicable government or security regulation specifications.

It will be evident that there are numerous embodiments of the present invention which are not expressly described above but which are clearly within the scope and spirit of the present invention. Therefore, the above description is intended to be exemplary only, and the actual scope of the invention is to be determined from the appended claims.

We claim:

1. An enclosure for secure interconnection access to a cabled system by a user thereof, which comprises:
    a housing having a back wall and a front wall connected by a peripheral wall, said walls defining an interior space in said housing, all joints therein being within said interior or on an interior side of said walls, said housing being constructed of a material which strongly resists penetration and is not readily degraded by the elements if placed in an exposed environment;
    said walls limiting user access to said interior space only through said front wall comprising an openable door, said door being hinged with a hinge whose working mechanism is disposed within said enclosure, such that no portion of said hinge is assessable from outside said housing when said door is closed;
    a system connection member disposed in said interior and including interconnect means for connection to said system only through a service access opening in said back wall or said peripheral wall, said system connection member being configured for access thereto by only a single user at a time; and
    locking means for secure closure of said door;
    whereby access to said cabled system through said enclosure is available only to one user at a time and is visually identifiable and closure of said door securely prevents unauthorized access to said connection means and said system.

2. An enclosure as in claim 1 wherein said service access opening is in said back wall and said enclosure further comprises means for securely affixing said enclosure to a structure wall containing a portion of said cabled system accessible through an opening in said structure wall, such that when said enclosure is affixed to said structure wall with said service access opening aligned with said opening in said structure wall, said interconnect means can be connected to said portion of said system through the aligned openings.

3. An enclosure as in claim 1 wherein said service access opening is in said peripheral wall and said enclosure further comprises means for securely affixing an end of a conduit containing a portion of said cabled system therein to said enclosure and extending through said service access opening into said interior, said portion of said cabled system being accessible at said end of said conduit, such that said interconnect means can thereby be connected to said portion of said system.

4. An enclosure as in claim 3 wherein said service access opening is in a top portion of said peripheral wall and said conduit extending therethrough is disposed above said enclosure.

5. An enclosure as in claim 3 wherein said service access opening is in a bottom portion of said peripheral wall and said conduit extending therethrough is disposed below said enclosure.

6. An enclosure as in claim 3 wherein said service access opening is in a side portion of said peripheral wall and said conduit extending therethrough is disposed laterally of said enclosure.

7. An enclosure as in claim 3 wherein said conduit comprises a vertical wire management conduit or a wire pole.

8. An enclosure as in claim 1 wherein said door is removable.

9. An enclosure as in claim 8 wherein said door is attached by hinges which permit said door to be removed from attachment to said front wall and subsequently be reattached thereto.

10. An enclosure as in claim 1 wherein said locking means comprises a hasp attached to said front wall and extending through a first aperture in said door when said door is closed, said hasp having a second aperture in the extended portion thereof to receive a lock.

11. An enclosure as in claim 1 wherein said material comprises a high-strength metal, metal alloy, ceramic or polymeric material.

12. An enclosure as in claim 1 further comprising said enclosure being disposed in a workplace facility and said cabled system being disposed internally of said facility.

13. An enclosure as in claim 12 wherein said cabled system comprises fiber optic cable, co-axial cable or conductive metal wire cable.

14. An enclosure as in claim 1 further comprising said enclosure being disposed in a workplace facility and said cabled system being disposed externally of said facility.

15. An enclosure as in claim 14 said cabled system comprises fiber optic cable, co-axial cable or conductive metal wire cable.

16. An enclosure as in claim 1 wherein each authorized user is identified upon accessing said cabled system.

* * * * *